(12) United States Patent
Umemoto

(10) Patent No.: US 6,591,810 B2
(45) Date of Patent: Jul. 15, 2003

(54) CONTROL SYSTEM FOR INTERNAL COMBUSTION ENGINE

(75) Inventor: Hideki Umemoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/996,598

(22) Filed: Nov. 30, 2001

(65) Prior Publication Data

US 2002/0189586 A1 Dec. 19, 2002

(30) Foreign Application Priority Data

Jun. 18, 2001 (JP) ...................................... 2001-182989

(51) Int. Cl.$^7$ ................................................ F02P 5/00
(52) U.S. Cl. ...................... 123/406.6; 123/609; 123/643
(58) Field of Search ......................... 123/406.6, 406.58, 123/609, 643, 406.64, 406.65

(56) References Cited

U.S. PATENT DOCUMENTS

| | | | |
|---|---|---|---|
| 4,502,446 A | * | 3/1985 | Kanegae et al. ............. 123/479 |
| 4,624,234 A | * | 11/1986 | Koketsu et al. ......... 123/406.57 |
| 4,809,668 A | * | 3/1989 | Toyama et al. ............. 123/609 |
| 6,281,664 B1 | * | 8/2001 | Nakamura et al. ............. 322/22 |

FOREIGN PATENT DOCUMENTS

JP    1-313673    12/1989

* cited by examiner

Primary Examiner—John Kwon
(74) Attorney, Agent, or Firm—Sughrue Mion, PLLC

(57) ABSTRACT

A control system for an internal combustion engine is provided which is capable of satisfying the demand of reducing the size, weight and cost thereof, and at the same time fulfilling sufficient timing accuracy for ignition timing without using a high performance CPU. The control system includes a reference signal generator (3) having a plurality of terminals and generating from the terminals reference signals representative of reference positions of the rotational position of the engine for respective cylinders, a fixed angle generator (4) for generating a fixed angle signal which has a resolution higher than that of the reference signals and which represents the rotational position of the engine, and an internal combustion engine control unit (1a) with an arithmetic processing unit (2) which receives the reference signals and the fixed angle signal to carry out ignition timing control, determines a predetermined cylinder from the reference signals, controls energization start timing and energization cut-off timing to an IG coil for the predetermined cylinder based on count values of the fixed angle signal with a corresponding one of the reference signals taken as a reference, performs energization start control and energization cut-off control when the count values are counted up, respectively, and thereafter performs energization start control and energization cut-off control to IG coils for the remaining cylinders, respectively, in a sequential manner at timing at which the fixed angle signal is counted up to a count value corresponding to an intercylinder interval between the cylinders until the next control of the predetermined cylinder comes.

11 Claims, 14 Drawing Sheets

FIG. 11

| OPERATING CONDITION | CRANK ANGLE | NUMBER OF PULSES CORRESPONDING TO CRANK |
|---|---|---|
| EC$_A$ OR TH$_A$ | CR$_{AT1}$, CR$_{AT2}$ | PL$_{AT1}$, PL$_{AT2}$ |
| EC$_B$ OR TH$_B$ | CR$_{BT1}$, CR$_{BT2}$ | PL$_{BT1}$, PL$_{BT2}$ |
| ⋮ | ⋮ | |
| ⋮ | ⋮ | |
| | | |

TM1: CONTROLS ENERGIZATION START TIMING T$_{1-1}$ AND IGNITION (CUT-OFF) TIMING T$_{2-1}$ OF CYLINDER
TM1: CONTROLS ENERGIZATION START TIMING T$_{1-2}$ AND IGNITION (CUT-OFF) TIMING T$_{2-2}$ OF CYLINDER
TM1: CONTROLS ENERGIZATION START TIMING T$_{1-n}$ AND IGNITION (CUT-OFF) TIMING T$_{2-n}$ OF CYLINDER

CONTROL SYSTEM FOR INTERNAL COMBUSTION ENGINE

This application is based on Application No. 2001-182989, filed in Japan on Jun. 18, 2001, the contents of which are hereby incorporated by reference.

BACKGROUND OF THE INVENTION

1. Field of the Invention

The present invention relates to a control system for an internal combustion engine, and in particular to ignition timing control of such a control system.

2. Description of the Related Art

FIG. 12 is a view schematically illustrating the construction of this kind of known control system for an internal combustion engine. In this figure, the known control system includes an internal combustion engine control unit (ECU) 1, a reference signal generator 3 for generating a reference signal representative of a reference position of the rotational position of an engine, and an ignition (IG) coil 8 connected with a spark plug 9. The ECU 1 includes a CPU 2 acting as an arithmetic processing section, a reference signal input I/F circuit 5, an IG coil drive output I/F circuit 7 connected with the ignition (IG) coil 8, and a RAM 11 acting as a temporary storage device. The CPU 2 includes a timer TM1 which is constituted by software. Here, note that the output side of the CPU 2 in FIG. 12 illustrates the configuration for one cylinder.

FIG. 13 is a time chart of signals at respective portions of the system of FIG. 12.

In the past, the ECU 1 has an ignition timing control function as one of its various control functions. For a control method of an ignition system, there is known a full transistor method in which energization start timing and energization cut-off timing to an IG coil are controlled to accumulate energy therein, and these timing are generally controlled by a CPU. In addition, these timing are important items for engine power and the stability thereof, and hence accurate control and high control accuracy are required.

As such a concrete full transistor control method, there is used a predetermined single timer to which the timing for starting energization is set with a predetermined timing signal (i.e., signal representative of a reference angle position of the rotational position of the engine) taken as a reference. Then, after start of energization, the timing of cutting off an energizing current is set to this timer. Ignition timing is the timing at which a high voltage is developed in an IG coil thereby to generate a spark in a spark plug connected therewith, and hence the timing of cutting off the energizing current is the ignition timing. That is, two timing (i.e., the timing of energization and the timing of cutting off the energization) is controlled by the single timer.

Now, the concrete content of such control will be described below. In the known system configuration of FIG. 12, connected with the ECU 1 are the reference signal generator 3, the IG coil 8 and the spark plug 9 for supplying an optimum amount of ignition energy to an internal combustion engine (hereinafter sometimes simply referred to as an engine) at optimal timing.

The reference signal input I/F circuit 5 of the ECU 1 serves to detect a signal from the reference signal generator 3, and upon detection of a reference signal, the reference signal input I/F circuit 5 converts it into a signal which can be controlled by the CPU 2, and supplies it to the CPU 2 as reference timing. The CPU 2 calculates optimal energization timing and optimal cut-off timing to the IG coil 8 based on the reference timing, and supplies a control output to the IG coil drive output I/F circuit 7, thereby driving the IG coil 8.

FIG. 13 illustrates signal waveforms at respective portions of FIG. 12. A signal from the reference signal generator 3 is passed through the reference signal input I/F circuit 5, so that the waveform of the signal S1 input to the CPU 2 is converted into a reference signal of a rectangular waveform of a high (H) level representative of reference timing for control of ignition timing such as, for example, BTDC 70° (i.e., a position of a crank angle of 70° before top dead center). The CPU 2 calculates the rotational speed of the engine from the reference timing, and optimal ignition timing and optimal energization time based on information from various sensors. Based on the results of these calculations, the CPU 2 controls energization start timing $T_1$ and ignition (energization cut-off) timing $T_2$ to the IG coil 8, for example, by using the timer TM1 of a predetermined time resolution, which is operated by clock pulses of a predetermined time resolution in the CPU 2.

Specifically, at a time point of the reference signal (BTDC 70°), the energization start timing $T_1$ is set to the timer TM1, and the timer TM1 is driven to start operation. At the same time, the ignition (cut-of timing $T_2$ is stored at a predetermined position of the RAM 11. When the timer TM1 performs counting and reaches the energization start timing $T_1$ previously set, an interrupt is generated so that the output signal S2 from the CPU 2 to the IG coil drive output I/F circuit 7 is changed from the L level to the H level, whereby the IG coil 8 starts to be energized, as illustrated at a waveform S3 in FIG. 13, thus accumulating energy therein.

Subsequently, the ignition (cut-off) timing $T_2$ previously stored in the RAM 11 is set to the timer TM1, and the timer TM1 is driven to start counting. When the timer TM1 reaches the ignition (cut-oft) timing $T_2$ thus set, an interrupt is generated so that the output signal S2 from the CPU 2 to the IG coil drive output I/F circuit 7 is changed from the H level to the L level, thereby causing the IG coil 8 to generate an ignition output from its secondary side to the spark plug 9 as illustrated at waveforms S3 and S4 in FIG. 13. Thereafter, each time the reference timing (reference signal S1) is generated and input to the CPU 2, the CPU 2 performs control and output in the same way as described above, whereby the engine is controlled in a stable manner.

In general, in a four-cycle engine having four cylinders, the ECU controls four or two ignition coils, and in a four-cycle engine having six cylinders, the ECU controls six or three ignition coils. In contrast to this, in two-cycle engines, it is necessary to control IG coils corresponding in number to cylinders according to the configuration and control processes of the engine, and hence in a two-cycle engine having four cylinders, four ignition coils must be controlled, and in a two-cycle engine having six cylinders, six ignition coils must be controlled. That is, in the case of two-cycle engines, the CPU is required to have timers corresponding in number to engine cylinders (i.e., the number of IG coils) in order to perform ignition timing control.

FIG. 14 illustrates a concrete example of the configuration of a known control system for an internal combustion engine; FIG. 15 illustrates a time chart of signals at respective portions of the system of FIG. 14; and FIGS. 16 through 18 illustrate the operation of the system of FIG. 14. In these figures, the same or corresponding parts as those of FIGS. 12 and 13 are identified by the same symbols.

Now, the operation of this known control system will be described below with reference to these figures. As described above, in the case of two-cycle engines, IG coils 8 corresponding in number to the cylinders must be controlled and driven independently of one another, and hence in a two-cycle engine having n cylinders for instance, the reference signal generator 3 generates n reference signals so that reference timing (reference signal S1) is input to the CPU 2 via the reference signal input I/F circuit 5. When the reference timing is input to the CPU 2, a reference signal interrupt is generated (step S100 of FIG. 16), and a check is made as to which cylinder generates the current interrupt (step S101), and then respective cylinders are processed as described below (step S103).

In the case where the cylinder having generated the current interrupt is cylinder #1 for example (step S103 of FIG. 17), energization start timing ($T_{1-1}$) is set to the timer TM1 for cylinder #1, and the timer TM1 is driven to start counting (step S1031), and ignition (cut-off) timing ($T_{2-1}$) is set to a predetermined position in the RAM 11 (step S1033). Thereafter, the remaining processing is carried out (step S1035), and then the current interrupt processing is ended.

Subsequently, when the timer TM1 reaches the energization start timing ($T_{1-1}$) as previously set, an interrupt is generated by the timer TM1 (step S105 of FIG. 18). A check is made as to whether the content of the current interrupt is energization start processing or ignition (cut-off) processing (step S1051).

In the case of energization start timing (step S1053), the output of the CPU 2 to an IG coil drive output I/F circuit 7 which controls and drives an IG coil 8 for cylinder #1 is switched from the L level to the H level, thereby starting energization of the corresponding IG coil 8 for cylinder #1 (step S10531). Thereafter, the ignition (cut-off timing ($T_{2-1}$) stored in the predetermined position in the RAM 11 is set to the timer TM1, and the timer TM1 is driven to start counting (step S10533), thus completing the interrupt processing.

On the other hand, in the case of ignition (cut-off timing (step S1055), the output of the CPU 2 to an IG coil drive output I/F circuit 7 which controls and drives an IG coil 8 for cylinder #1 is switched from the H level to the L level, thereby generating an ignition output to the corresponding IG coil 8 for cylinder #1 (step S10551). Here, note that in the case of cylinder #2, similar setting and driving processing is carried out for the timer TM2 for cylinder #2.

In the known control system for an internal combustion engine as constructed above, as the number of timers to be used for control increases, a CPU of higher performance is required, resulting in an expensive one of high performance specifications. Thus, the cost of the CPU increases, and hence the cost of the internal combustion engine control unit (ECU) as a whole rises, too. In addition, the CPU of high performance generally has an increased size, so there is a tendency that the size of internal combustion engine control unit (ECU) also increases. At present, the small size, lightness and low cost are demanded of an internal combustion engine control unit (ECU), and there arises a problem that the above tendency makes it difficult to satisfy these demands.

SUMMARY OF THE INVENTION

The present invention is intended to obviate the problem as referred to above, and has for its object to provide a control system for an internal combustion engine which is capable of satisfying the demand of reducing the size, weight and cost of an internal combustion engine control unit (ECU), and at the same time fulfilling sufficient timing accuracy for ignition timing.

Bearing the above object in mind, the present invention resides in a control system for an internal combustion engine, including: a reference signal generator having a plurality of terminals and generating from the terminals reference signals representative of reference positions of the rotational position of the engine for respective cylinders; a fixed angle generator for generating a fixed angle signal which has a resolution higher than that of the reference signals and which represents the rotational position of the engine; and an internal combustion engine control unit with an arithmetic processing unit which receives the reference signals and the fixed angle signal to carry out ignition timing control. The internal combustion engine control unit determines a predetermined cylinder from the reference signals, controls energization start timing and energization cut-off timing to an IG coil for the predetermined cylinder based on count values of the fixed angle signal with a corresponding one of the reference signals taken as a reference, performs energization start control and energization cut-off control when the count values are counted up, respectively, and thereafter performs energization start control and energization cut-off control to IG coils for the remaining cylinders, respectively, in a sequential manner at timing at which the fixed angle signal is counted up to a count value corresponding to an intercylinder interval between the cylinders until the next control of the predetermined cylinder comes.

In a preferred form of the present invention, the internal combustion engine control unit includes a storage section for storing a table including crank angles representative of engine rotational angles from each of the reference signals to an ideal energization start timing and an ideal energization cut-off timing to each IG coil in respective operating conditions. The arithmetic processing section includes counters for controlling energization start timing and energization cut-off timing, respectively, to the IG coils, to which counters count values of the fixed angle signal corresponding to crank angles are set respectively according to the table, so that the counters count up to the set values, respectively, at the time of controlling the predetermined cylinder, and thereafter the count value corresponding to the intercylinder interval between the cylinders are set to the counters, which then count the fixed angle signal up to the set count value.

In another preferred form of the present invention, the arithmetic processing section of the internal combustion engine control unit sets the count values to the counters, also sets a cylinder to be controlled to the storage section, and refers to the cylinder to be controlled which is stored in the storage section during control.

In a further preferred form of the present invention, the reference signal generator generates the reference signals from separate terminals provided one for each cylinder. The internal combustion engine control unit has input terminals provided one for each cylinder for receiving the reference signals. The arithmetic processing section identifies the cylinders based on from which input terminals the reference signals are input to the internal combustion engine control unit.

In a still further preferred form of the present invention, the arithmetic processing section of the internal combustion engine control unit determines the operating conditions from a cycle of the reference signals input thereto.

Particularly, a control system for an internal combustion engine according to the present invention includes a reference signal generator for generating reference signals representative of reference positions of the rotation position of the engine, a fixed angle signal generator for generating a fixed angle signal, and an internal combustion engine control unit (ECU) for detecting and receiving these signals and generating a drive output to each IG coil. The ECU includes a CPU, and the CPU constitutes two counters for counting the fixed angle signal based on the reference signals. One of the counters serves to control energization start timing to the IG coils, and the other counter serves to control ignition (cut-off) timing to the IG coils.

By employing an angle counting method in which the fixed angle signal is counted by means of the two counters based on the reference signals to control the energization start timing and the ignition (energization cut-off) timing to the IG coils, the use of only two counters constituted by the CPU is sufficient for controlling the IG coils even where the number of IG coils is more than two, thus making it possible to construct the system by using an inexpensive UPU. Consequently, the internal combustion engine control unit (ECU) can be reduced in size, weight and cost. Moreover, it is possible to achieve a system which can satisfy sufficient timing accuracy in the ignition timing. In addition, due to the use of the angle counting method, it is possible to perform particularly accurate ignition timing control even during idling, acceleration, deceleration, etc., in which variations in rotation of the engine are great.

The above and other objects, features and advantages of the present invention will become more readily apparent to those skilled in the art from the following detailed description of a preferred embodiment of the present invention taken in conjunction with the accompanying drawings.

BRIEF DESCRIPTION OF THE DRAWINGS

FIG. 11 is a view illustrating one example of a table stored in a RAM for calculating engine rotational angles from the reference signals to energization start timing and energization cut-off timing in the system according to the present invention.

DESCRIPTION OF THE PREFERRED EMBODIMENT

Now, a preferred embodiment of the present invention will be described in detail while referring to the accompanying drawings.

Embodiment 1.

Figure 1:
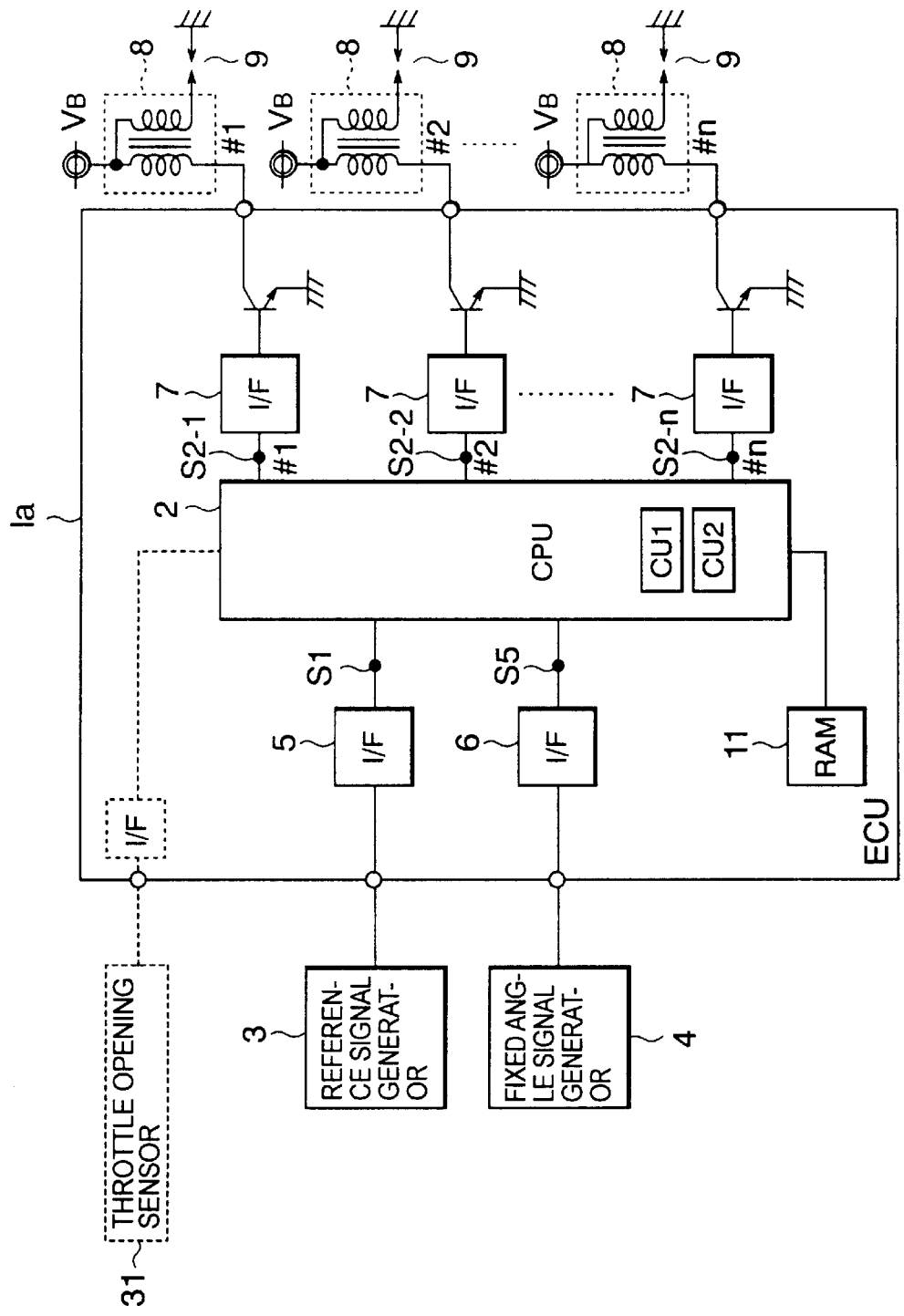
FIG. 1 illustrates the construction of a control system for an internal combustion engine according to one embodiment of the present invention.

FIG. 1 illustrates the construction of a control system for an internal combustion engine according to one embodiment of the present invention. In this figure, the same or corresponding parts as those of the above-mentioned known control system for an internal combustion engine are identified by the same symbols. The control system of the present invention includes an internal combustion engine control unit (ECU) 1a, a reference signal generator 3 for generating reference signals representative of reference positions of the rotational position of the engine, a fixed angle signal generator 4 for generating a fixed angle signal which has a resolution higher than that of the reference signals and which represents the rotational position of the engine, and a plurality of ignition coils 8 connected with corresponding spark plugs 9, respectively. The internal combustion engine control unit (ECU) 1a includes a CPI 2 acting as an arithmetic processing section, a reference signal input I/F circuit 5, a fixed angle signal input I/F circuit 6, a plurality of ignition (IG) coil drive output I/F circuits 7, and a RAM 11 acting as a temporary storage section. The CPU 2 includes counters CU1 and CU2 which are constituted by software. In addition, a reference numeral 31 designates a throttle opening sensor to be described later.

Figure 2:
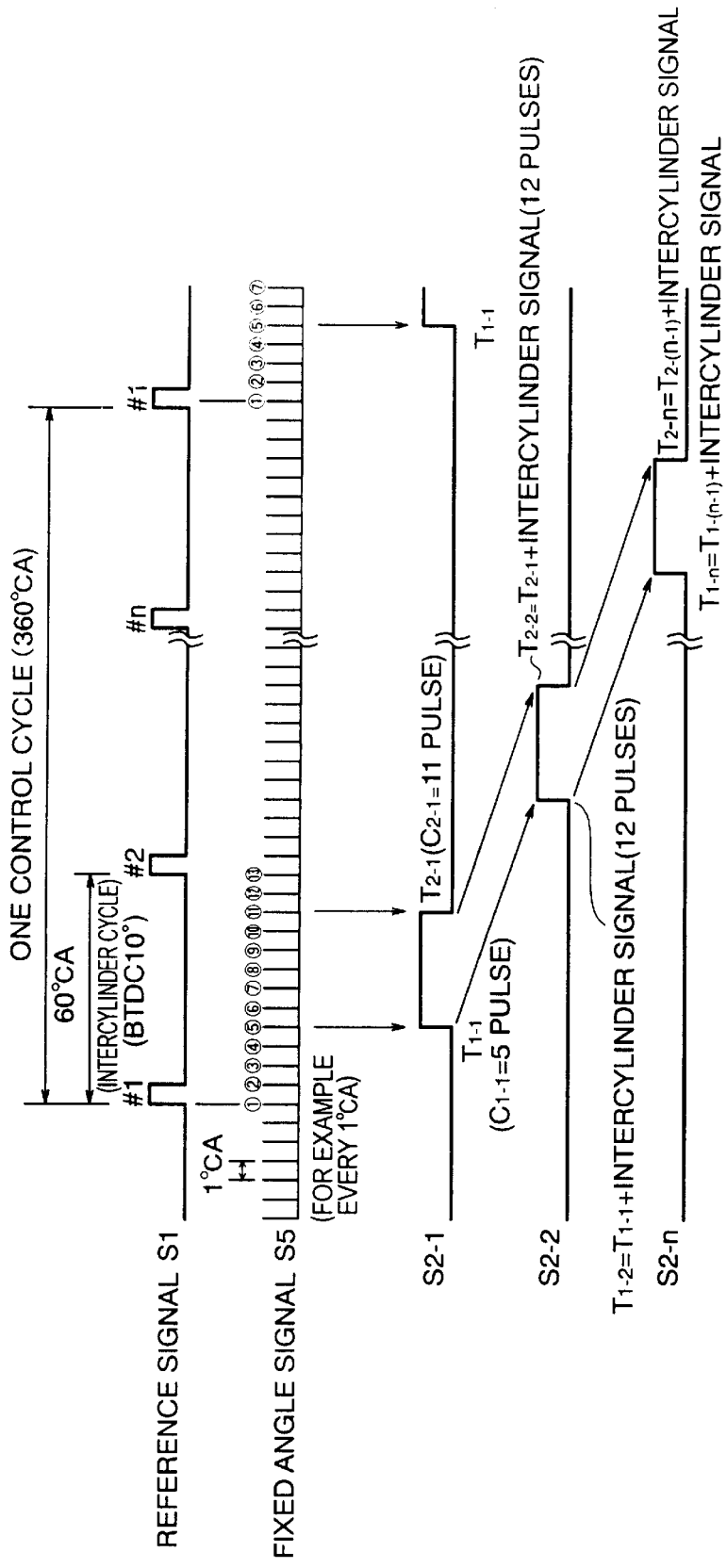
FIG. 2 is a time chart of signals at respective portions of the system of FIG. 1.

FIG. 2 illustrates a time chart of signals at respective portions of the system of FIG. 1.

Figure 3:
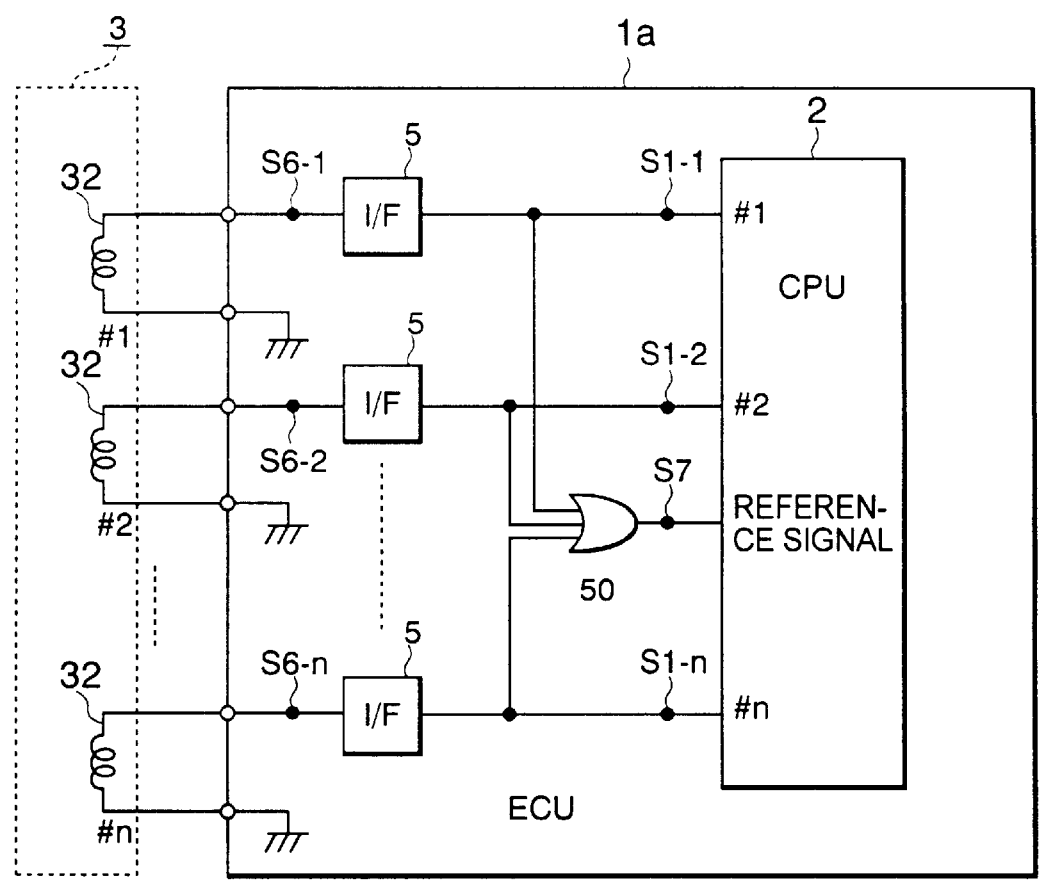
FIG. 3 is a view illustrating the configuration of an input portion of a reference signal generator in the system according to the present invention.
Figure 4:
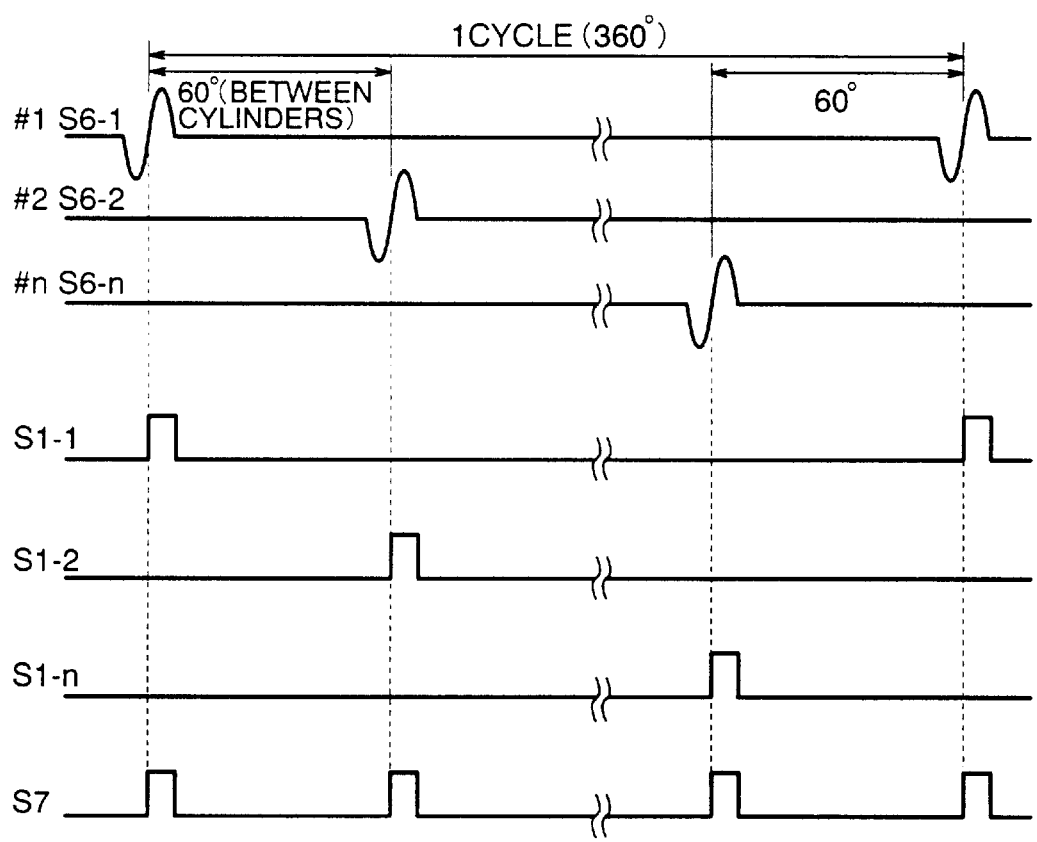
FIG. 4 is a time chart of signals at respective portions of FIG. 3.

In FIG. 1, an input portion of the ECU 1a, through which the reference signals from the reference signal generator 3 are input, is schematically illustrated but actually configured as shown in FIG. 3 for instance. FIG. 4 illustrates a time chart of signals at respective portions of FIG. 3.

Figure 5:
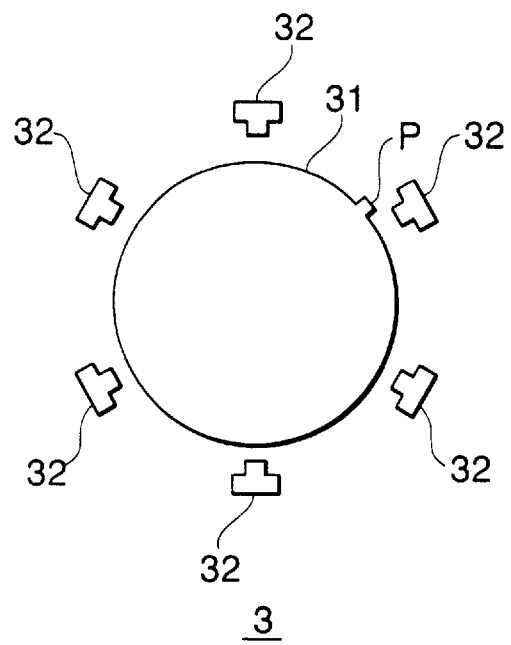
FIG. 5 is a view illustrating one example of the configuration of the reference signal generator in the system according to the present invention.

One example of the configuration of the reference signal generator 3 is illustrated in FIG. 5. The reference signal generator 3 can be constructed such that a protrusion P formed on the surface of a disk 31, which is arranged around the crank shaft (not shown in particular) of the engine so as to be rotated in synchronization therewith, is detected by a plurality of rotation sensors 32 in the form of electromagnetic sensors for example, which are arranged around the disk 31 at equal intervals at locations corresponding to the respective cylinders.

Figure 6:
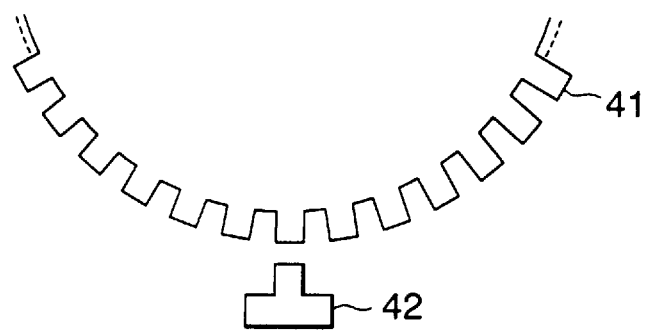
FIG. 6 is a view illustrating one example of the configuration of a fixed angle signal generator in the system according to the present invention.
Figure 7:
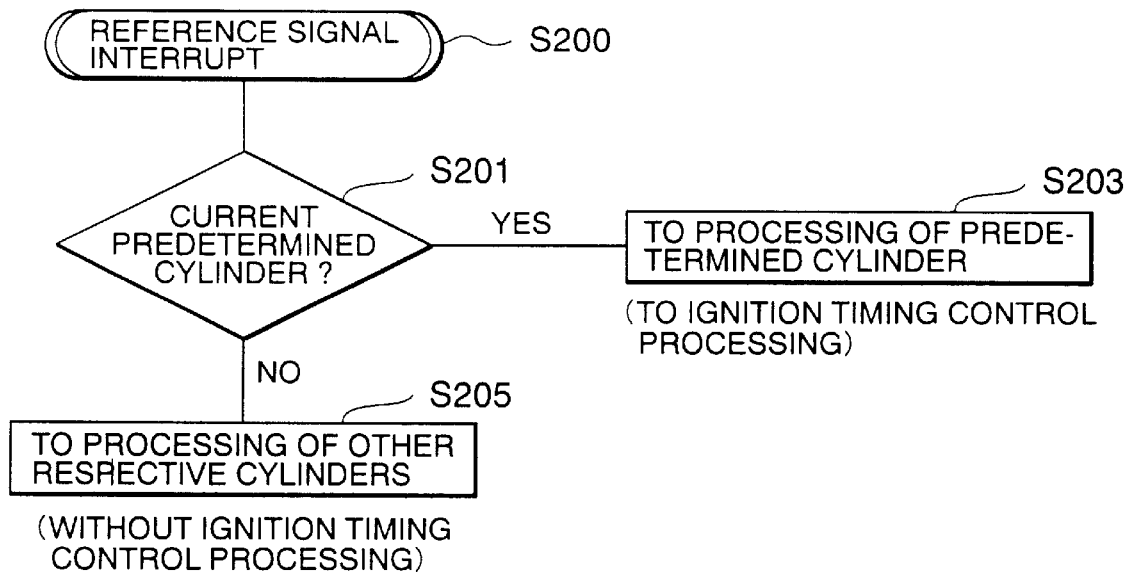
FIG. 7 is a flow chart illustrating the operation of the system of FIG. 1.
Figure 8:
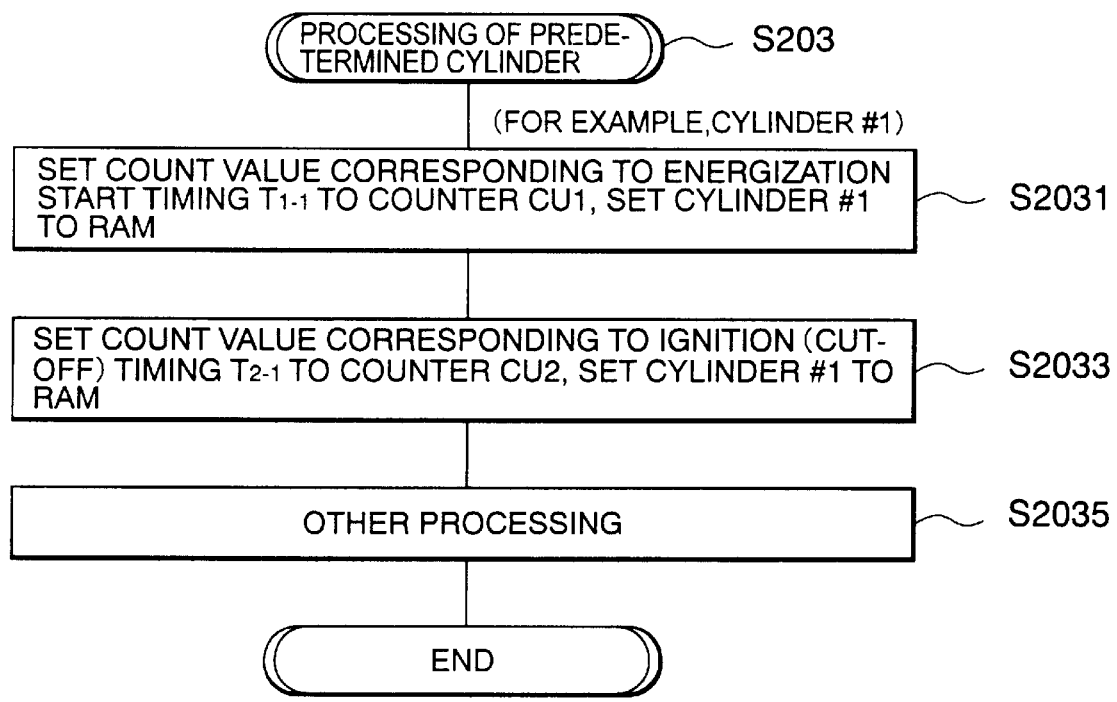
FIG. 8 is a flow chart illustrating the operation of the system of FIG. 1.
Figure 9:
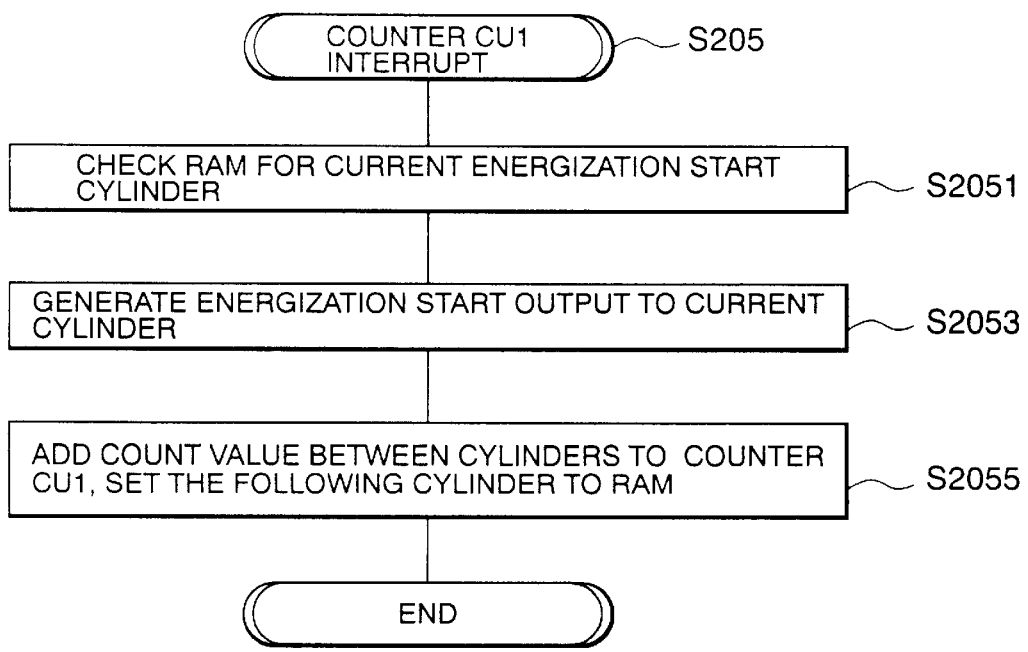
FIG. 9 is a flow chart illustrating the operation of the system of FIG. 1.
Figure 10:
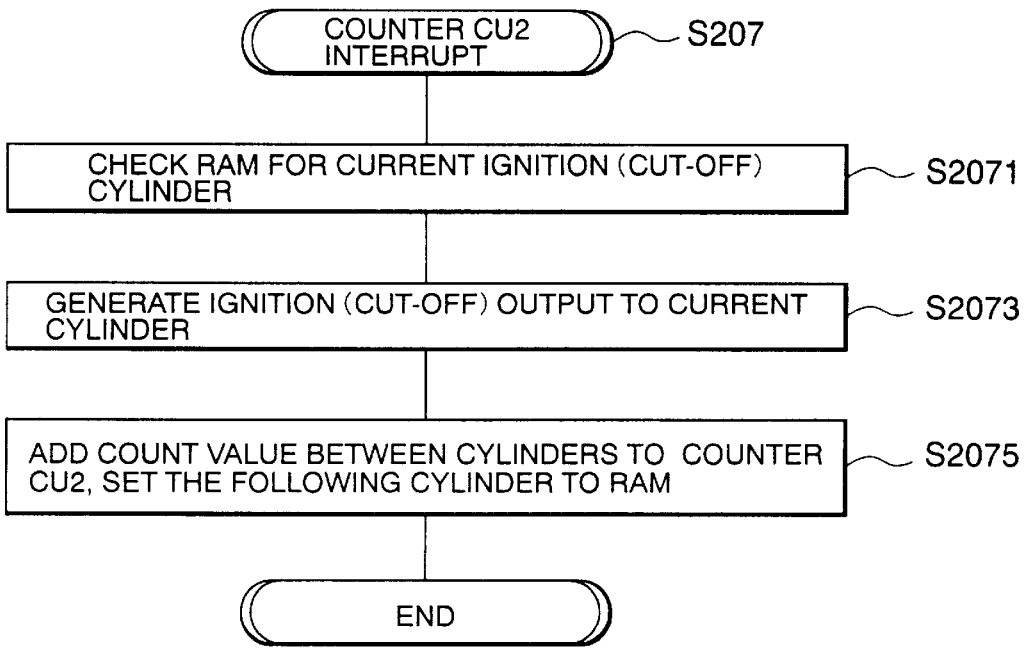
FIG. 10 is a flow chart illustrating the operation of the system of FIG. 1.
Figure 12:
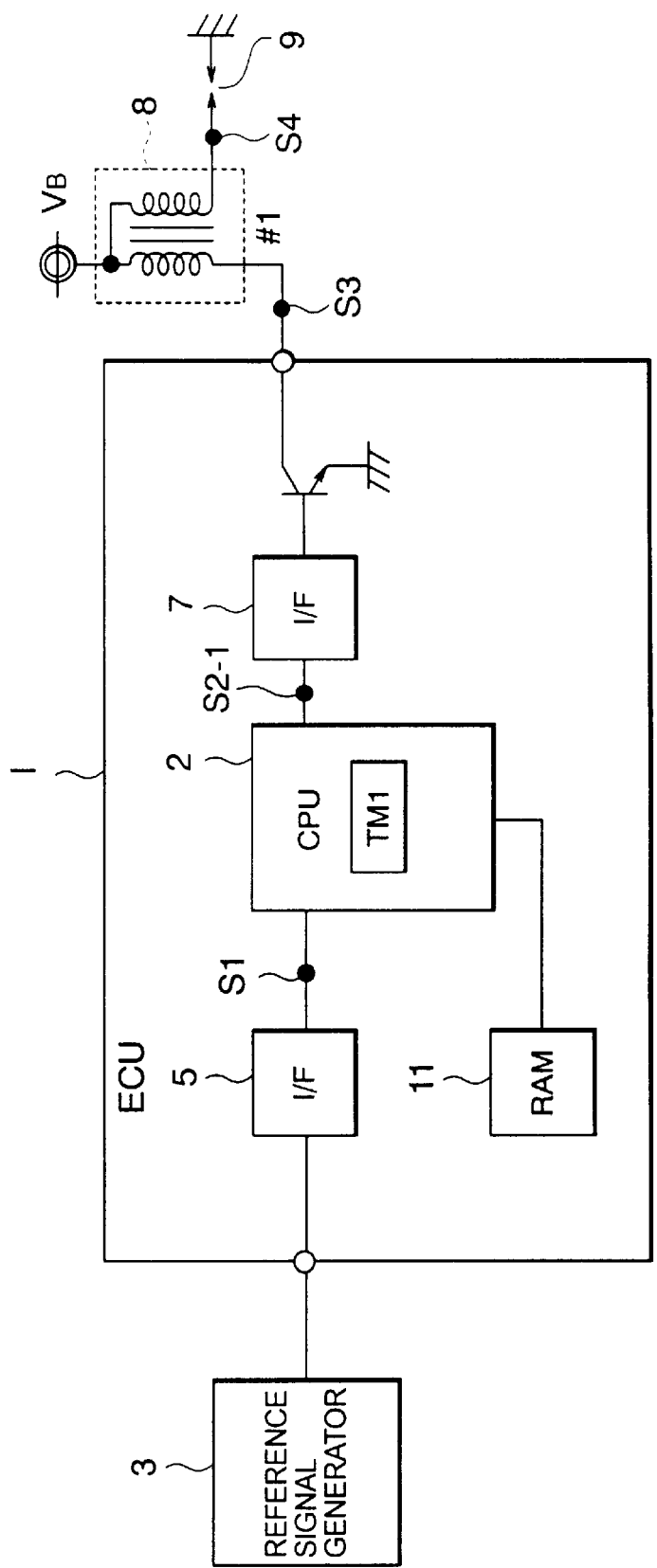
FIG. 12 is a view schematically illustrating the configuration of this kind of known control system for an internal combustion engine.
Figure 13:
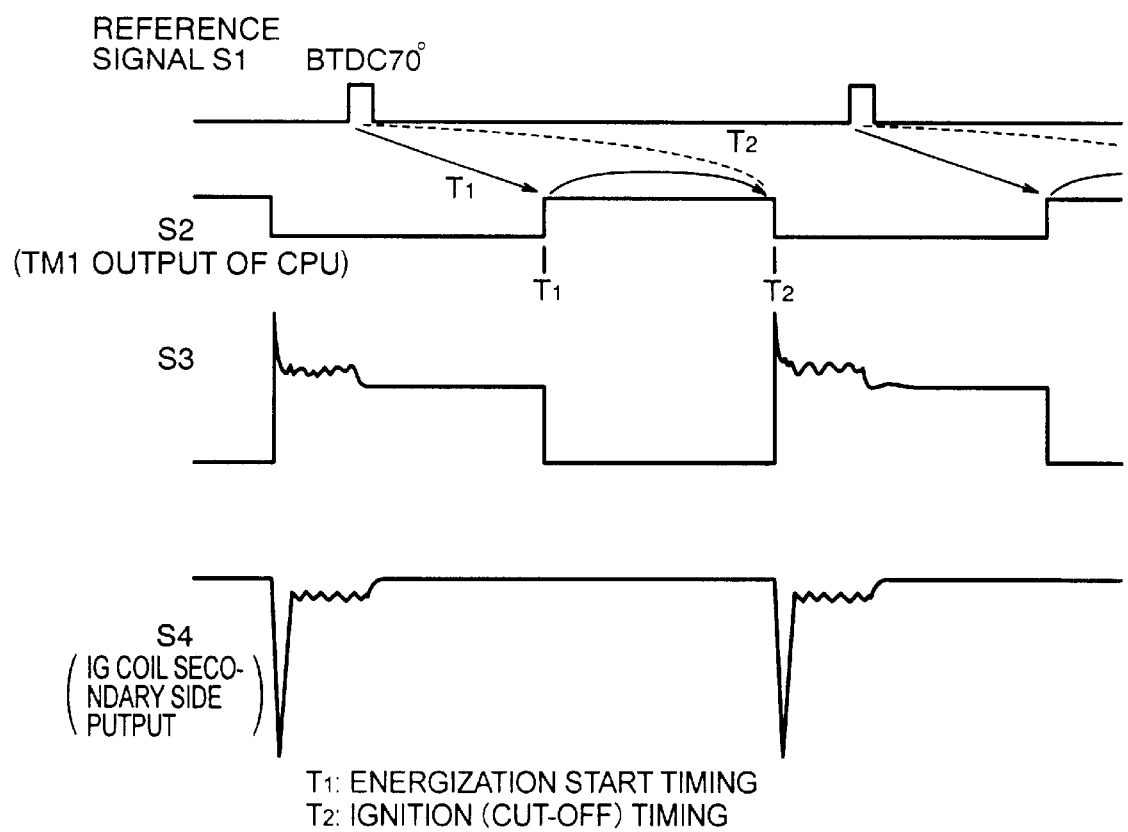
FIG. 13 is a time chart of signals at respective portions of the system of FIG. 12.
Figure 14:
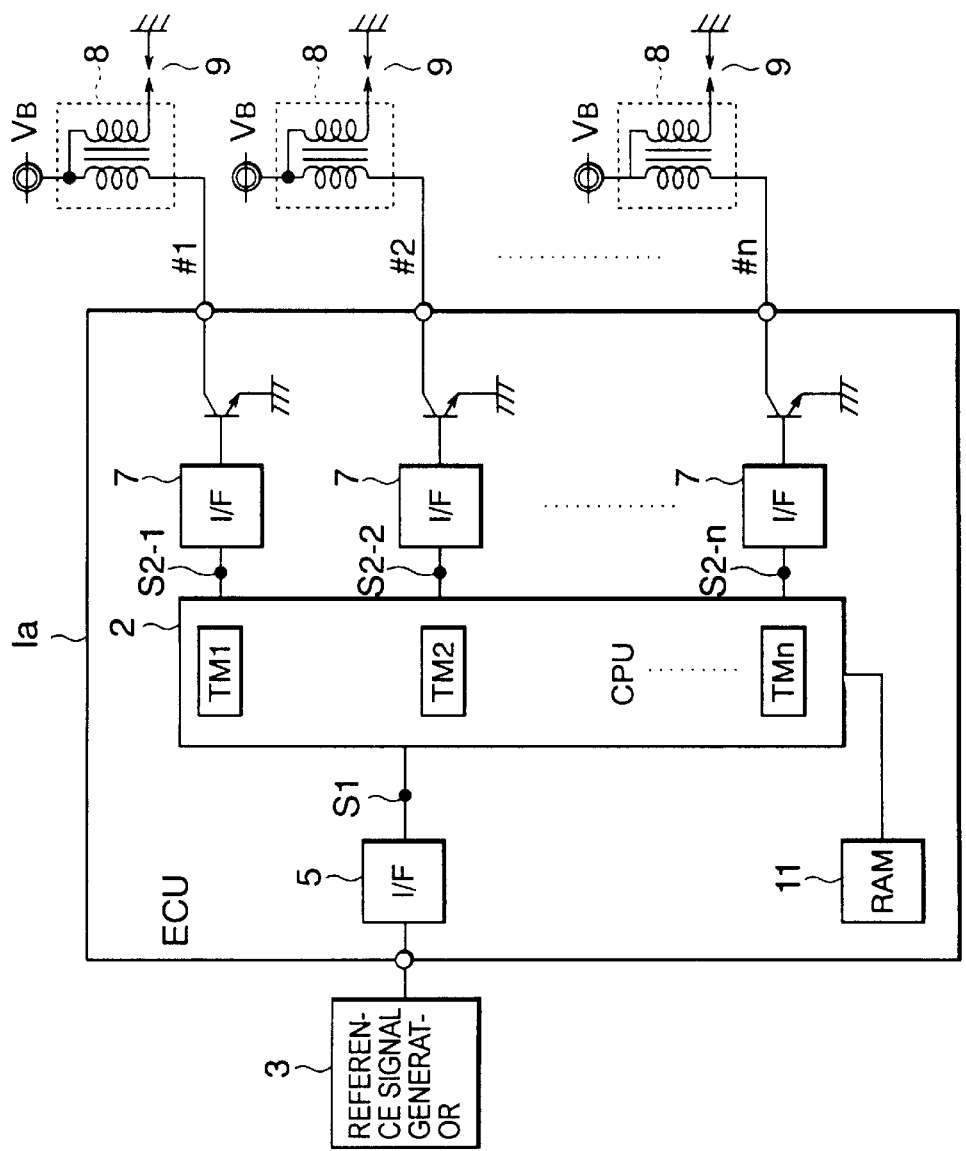
FIG. 14 is a view illustrating a concrete example of a known system configuration.
Figure 15:
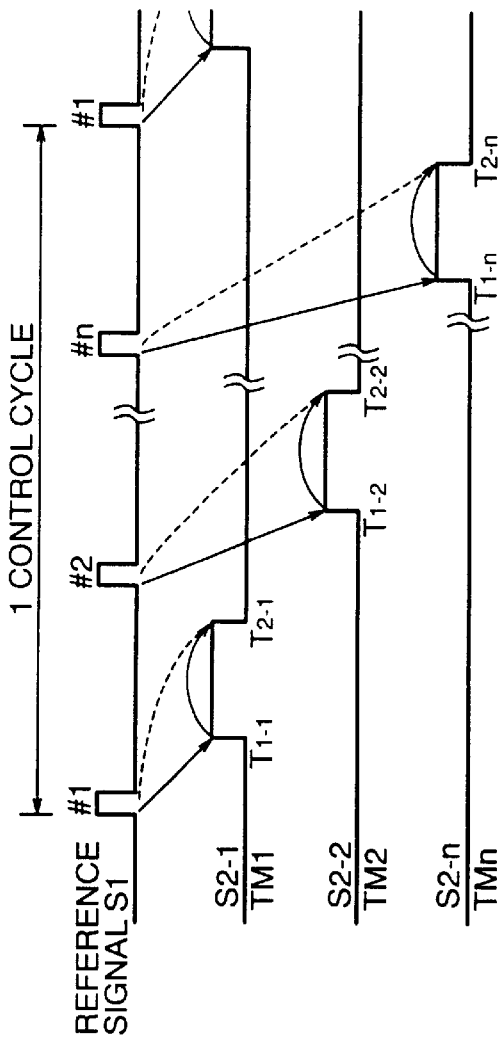
FIG. 15 is a time chart of signals at respective portions of the system of FIG. 14.
Figure 16:
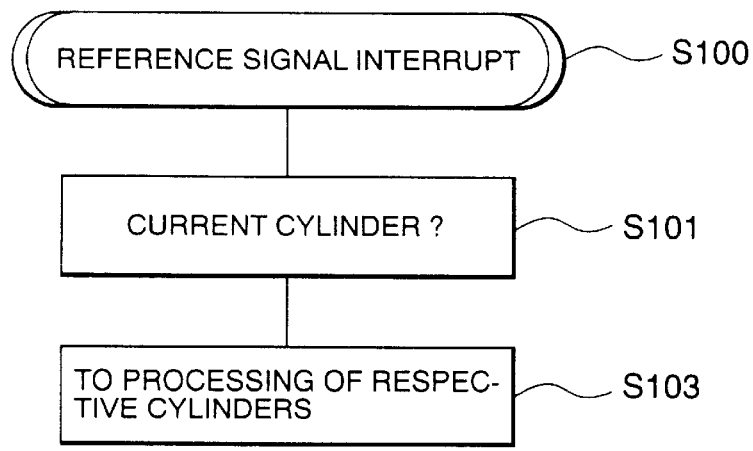
FIG. 16 is a flow chart illustrating the operation of the system of FIG. 14.
Figure 17:
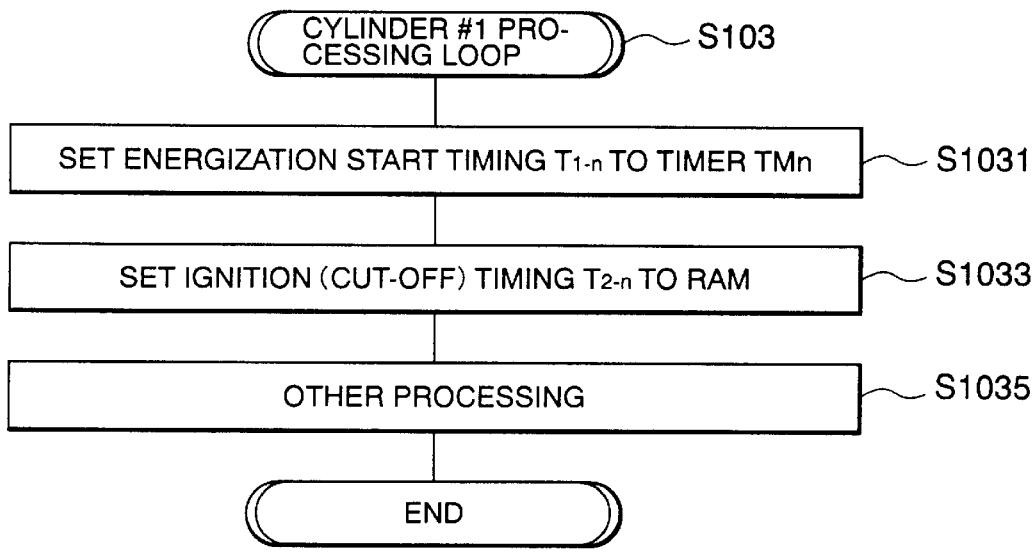
FIG. 17 is a flow chart illustrating the operation of the system of FIG. 14.
Figure 18:
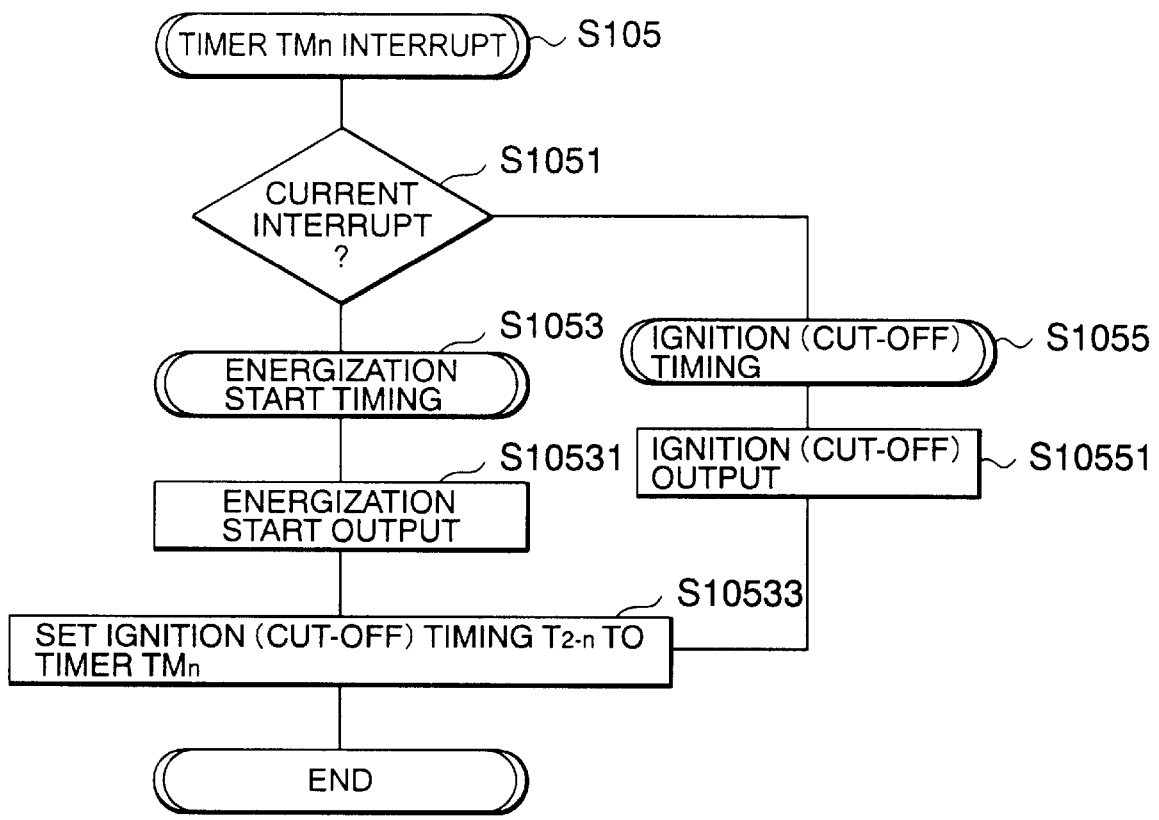
FIG. 18 is a flow chart illustrating the operation of the system of FIG. 14.

FIG. 6 illustrates one example of the configuration of the fixed angle signal generator 4. The fixed angle signal generator 4 for generating a high resolution signal (crank angle signal) may be constructed such that the teeth of a ring gear 41, which is usually used for starting an engine by means of a starter and which is arranged around the crank shaft (not shown in particular) of the engine so as to be rotated in synchronization therewith, is detected by a rotation sensor 42 in the form of an electromagnetic sensor for example.

Turning now to the input portion of the reference signal generator 3 as shown in FIG. 3, in case of n cylinders, the reference signal generator 3 generates signals S6–1 through S6–n as n reference signals independently of one another, which are input from respective input terminals of the ECU 1a to the CPU 2 as reference timing signals S1–1 through S1–n via the respective reference signal input I/F circuits 5. Also, the reference signals S1–1 through S1–n from the respective reference signal input I/F circuits 5 are input to the CPU 2 via a logical sum circuit 50 as a logical sum (OR) signal S7. When the logical sum signal S7 is input to the CPU 2, a reference signal interrupt is generated so that a check is made as to whether each of the input terminals of the CPU 2, through which the reference signals S1–1 through S1–n are input thereto, is at the H level or at the L level, thereby making it possible to identify which cylinder a currently generated reference signal correspond to. Thus, various kinds of control operations can be carried out based on the results of the cylinder identification. Here, note that FIG. 4 illustrates reference signals in the case of a two-cycle six-cylinder engine.

Next, the operation of the system of the invention will be described according to FIGS. 1 and 2 and flow charts of FIGS. 7 through 10 which illustrate the operation of the system of FIG. 1. Here, the reference signal S1 obtained from the reference signal generator 3 via the reference signal input I/F circuit 5 in FIGS. 1 and 2 is assumed to be equivalent to the reference signals S1–1 through S1–n and the logical sum signal S7 in FIGS. 3 and 4. In the present invention, by using a predetermined resolution signal of a crank angle, for example a fixed angle signal S5 of 1° crank angle (CA), from the fixed angle signal generator 4, and by adopting the angle counting method for controlling the energization start timing and the ignition (energization cut-off) timing to the IG coils 8, it is possible to construct the control system in such a manner that even in cases where the number of IG coils 8 to be controlled is two or more, the number of counters CU constituted by the CPU 2 to be used can be reduced while fulfilling sufficient timing accuracy of the ignition timing.

The control system is also constructed such that the reference signal S1 and the fixed angle signal S5 are input to the CPU 2, which then drives the counters CU1 and CU2 to count based on the fixed angle signal S5. When there is generated an interrupt corresponding to each cylinder reference timing (step S200 of FIG. 7), it is checked whether the generated interrupt corresponds to a predetermined cylinder (for instance, cylinder #1) (step S201). In case of the predetermined cylinder, ignition timing control is performed (step S203), whereas in case of another cylinder, other processing is performed and ignition timing control is not carried out (step S205). For this reason, when the current interrupt corresponds to a cylinder other than the predetermined cylinder, it is possible to shorten the interrupt processing time and hence improve the efficiency thereof.

For ignition timing control on the predetermined cylinder (step S203 of FIG. 8), the predetermined cylinder (for instance, cylinder #1) is identified from a current reference signal S1 representative of a current interrupt angle, and a crank angle from the reference signal S1 to the energization start timing and a crank angle from the reference signal S1 to the ignition (cut-off) timing are calculated, and these angles thus calculated are then converted into count values (the number of pulses) corresponding to the fixed angle signal S5, i.e., a count value $C_{1-n}$ corresponding to the energization start timing $T_{1-n}$, and a count value $C_{2-n}$ corresponding to the ignition (cut-off) timing $T_{2-n}$.

The respective engine rotational angles, i.e., crank angles from the reference signal S1 to the energization start timing and the igniting (energization cut-off) timing to the IG coils 8 are carried out as follows. For example, in the RAM 21, there is in advance stored a table representing crank angles (engine rotational angles) $CR_{AT1}$, $CR_{AT2}$, . . . from the reference signal S1 to an ideal fuel injection start time point $T_{1-n}$, and an ideal ignition (energization cut-off) time point $T_{2-n}$, respectively, in respective operating conditions, as illustrated in FIG. 11. The crank angles are calculated from this table, and converted into the count values corresponding to the fixed angle signal S5. The operating conditions are determined by the numbers of revolutions per minute of the engine $EC_A$, $EC_B$ . . . obtained from the cycle of the reference signal S1 or by throttle openings $TH_A$, $TH_B$, . . . obtained from the throttle opening sensor 31 (see FIG. 1).

For instance, when the angle from the current interrupt reference angle to the energization start timing is 5° and the fixed angle signal has a pulse interval of 1°, the above-mentioned count value becomes 5 count (pulses)(=5°/1°).

Here, note that as shown to the right in FIG. 11, there may be employed a table which directly represents the number of pulses $PL_{AT1}$, $PL_{AT2}$, . . . of the fixed angle signal S5 corresponding to the crank angles from the reference signal S1 to the ideal energization start timing $T_{1-n}$ and the ideal ignition (energization cut-off) timing $T_{2-n}$ in respective operating conditions. In this case, the operation load of the CPU 2 is reduced.

Subsequently, the count value $C_{1-n}$ corresponding to the energization start timing $T_{1-n}$ is set to the counter CU1 which controls the energization start timing, and the counter CU1 is driven to start counting (step S2031). Similarly, the count value $C_{2-n}$ corresponding to the ignition (cut-off) timing $T_{2-n}$ is set to the counter CU2 which controls the ignition (cut-off) timing, and the counter CU2 is driven to start counting (step S2033). In addition, simultaneous with this, a cylinder No. corresponding to the timing (count) value currently set to each counter is set to a predetermined position of the RAM 11 (steps S2031 through S2033). Then, other control operations are carried out (step S2035) and the interrupt processing is completed.

Next, when each of the counters CU1 and CU2 counts up to their set value, an interrupt is generated. At this time, which cylinder the current interrupt corresponds to is checked by the content of the predetermined position in the RAM 11, and a drive output S2 is generated to the IG coil 8 of the corresponding cylinder. Thereafter, the count value of the fixed angle signal S5 corresponding to a difference in angle from the current cylinder to the next cylinder is added to the counters CU1 and CU2, respectively, and the next cylinder to be processed is set to the RAM 11.

Specifically, when an interrupt is generated by the energization start counter CU1 (step S205 of FIG. 9), a cylinder to which the current energization is to be started is checked by the content of the flag in the RAM 11 (step S2051), and an energization start output is generated to the predetermined cylinder, that is, the signal S2 is switched from the L level to the H level (step S2053). Then, the count value corresponding to the intercylinder difference or interval from the current cylinder to the next cylinder is added to the counter CU1 and the thus added count value is set to the counter CU1. At the same time, the next cylinder No. is set to the RAM 11, and the interrupt processing is completed (step S2055).

Similarly, when an interrupt is generated by the ignition (energization cut-off) counter CU2 (step S207 of FIG. 10), a cylinder to which the current ignition (cut-off) is to be performed is checked by the content of the RAM 11 (step S2071), and an ignition (cut-off) output is generated to the predetermined cylinder, that is, the signal S2 is switched from the H level to the L level (step S2073). Subsequently, the count value corresponding to the intercylinder difference or interval from the current cylinder to the next cylinder is added to the counter CU2, and the thus added count value is set to the counter CU2. At the same time, the next cylinder No. is set to the RAM 11 and the interrupt processing is completed (step S2075).

By performing the above control, it is possible to achieve an effect that the ignition timing of all the cylinders can be controlled by means of only two counters CU1 and CU2 irrespective of the number of cylinders.

Moreover, by setting a difference (count value) in angle from the current cylinder to the next cylinder and the next cylinder number to the RAM every time an interrupt is generated by each counter, it is possible to achieve an effect that even in cases where abnormality (a break of signal lines, etc.) occurs in the reference signal S1 in the course of transmission thereof, it becomes possible to continue controlling the ignition timing in a stable manner as long as the fixed angle signal S5 is normal.

By adopting the angle counting method, even in cases where variations in rotation of the engine are great at the time of idling, acceleration, deceleration, etc., the rotational position of the engine is always measured and counted accurately, thus making it possible to perform stable ignition timing control.

In addition, the above-described control system of the present invention is useful and effective for two-cycle direct-injection engine systems in which variations in the engine rotation are generally great and high control accuracy is required.

As described in the foregoing, the present invention provides the following advantages.

According to the present invention, a control system for an internal combustion engine includes a reference signal generator having a plurality of terminals and generating from the terminals reference signals representative of reference positions of the rotational position of the engine for respective cylinders, a fixed angle generator for generating a fixed angle signal which has a resolution higher than that of the reference signals and which represents the rotational position of the engine, and an internal combustion engine control unit with an arithmetic processing unit which receives the reference signals and the fixed angle signal to carry out ignition timing control. The internal combustion engine control unit determines a predetermined cylinder from the reference signals, controls energization start timing and energization cut-off timing to an IG coil for the predetermined cylinder based on count values of the fixed angle signal with a corresponding one of the reference signals taken as a reference, performs energization start control and energization cut-off control when the count values are counted up, respectively, and thereafter performs energization start control and energization cut-off control to IG coils for the remaining cylinders, respectively, in a sequential manner at timing at which the fixed angle signal is counted up to a count value corresponding to an intercylinder interval between the cylinders until the next control of the predetermined cylinder comes. With this arrangement, it is possible to control the ignition timing of all the cylinders irrespective of the number thereof without requiring the provision of counters corresponding in number to the cylinders, as a result of which it becomes unnecessary to employ a high performance processor for the arithmetic processing section of the internal combustion engine control unit. Consequently, the demand of reducing the size, weight and cost of the internal combustion engine control unit can be satisfied, and required timing accuracy of the ignition timing can also be fulfilled to a satisfactory extent by means of an angle counting control method using the fixed angle signal.

Preferably, the internal combustion engine control unit includes a storage section for storing a table including crank angles representative of engine rotational angles from each of the reference signals to an ideal energization start timing and an ideal energization cut-off timing to each IG coil in respective operating conditions. The arithmetic processing section includes counters for controlling energization start timing and energization cut-off timing, respectively, to the IG coils, to which counters count values of the fixed angle signal corresponding to crank angles are set respectively according to the table, so that the counters count up to the set values, respectively, at the time of controlling the predetermined cylinder, and thereafter the count value corresponding to the intercylinder interval between the cylinders are set to the counters, which then count the fixed angle signal up to the set count value. Thus, with the use of the two counters provided in the arithmetic processing section of the internal combustion engine control unit, it is possible to control the ignition timing of all the cylinders regardless of the number of the cylinders.

Preferably, the arithmetic processing section of the internal combustion engine control unit sets the count values to the counters, also sets a cylinder to be controlled to the storage section, and refers to the cylinder to be controlled which is stored in the storage section during control. Accordingly, even in the event that abnormality (a break of signal lines, etc.) occurs in the reference signal in the course of transmission thereof, it becomes possible to continue controlling the ignition timing in a stable manner as long as the fixed angle signal is normal.

Preferably, the reference signal generator generates the reference signals from separate terminals provided one for each cylinder. The internal combustion engine control unit has input terminals provided one for each cylinder for receiving the reference signals. The arithmetic processing section identifies the cylinders based on from which input terminals the reference signals are input to the internal combustion engine control unit. Thus, the identification of the cylinders can be easily carried out, and hence the load of the arithmetic processing section can be reduced, making it unnecessary to employ a high performance processor for the arithmetic processing section of the internal combustion engine control unit.

Preferably, the arithmetic processing section of the internal combustion engine control unit determines the operating conditions from a cycle of the reference signals input thereto. Thus, the operating conditions of the engine can be determined with ease, and as a consequence, the load of the arithmetic processing section can be reduced, and it becomes unnecessary to employ a high performance processor for the arithmetic processing section of the internal combustion engine control unit.

While the invention has been described in terms of a preferred embodiment, those skilled in the art will recognize that the invention can be practiced with modifications within the spirit and scope of the appended claims.

What is claimed is:

1. A control system for an internal combustion engine comprising:

a reference signal generator having a plurality of terminals and generating from said terminals reference signals representative of reference positions of the rotational position of the engine for respective cylinders;

a fixed angle generator for generating a fixed angle signal which has a resolution higher than that of said reference signals and which represents the rotational position of the engine; and an internal combustion engine control unit with an arithmetic processing unit which receives said reference signals and said fixed angle signal to carry out ignition timing control, determines a predetermined cylinder from said reference signals, controls energization start timing and energization cut-off timing to an IG coil for said predetermined cylinder based on count values of said fixed angle signal with a corresponding one of said reference signals taken as a reference, performs energization start control and energization cut-off control when said count values are counted up, respectively, and thereafter performs energization start control and energization cut-off control to IG coils for the remaining cylinders, respectively, in a sequential manner at timing at which said fixed angle signal is counted up to a count value corresponding to an intercylinder interval between the cylinders until the next control of said predetermined cylinder comes.

2. The control system for an internal combustion engine according to claim 1, wherein said internal combustion engine control unit comprises a storage section for storing a table including crank angles representative of engine rotational angles from each of said reference signals to an ideal energization start timing and an ideal energization cut-off timing to each IG coil in respective operating conditions, and said arithmetic processing section comprises counters for controlling energization start timing and energization cut-off timing, respectively, to said IG coils, to which counters count values of said fixed angle signal corresponding to crank angles are set respectively according to said table, so that said counters count up to said set values, respectively, at the time of controlling said predetermined cylinder, and thereafter said count value corresponding to said intercylinder interval between the cylinders are set to the counters, which then count said fixed angle signal up to said set count value.

3. The control system for an internal combustion engine according to claim 2, wherein said arithmetic processing section of said internal combustion engine control unit sets said count values to said counters, also sets a cylinder to be controlled to said storage section, and refers to said cylinder to be controlled which is stored in said storage section during control.

4. The control system for an internal combustion engine according to claim 1, wherein said reference signal generator generates said reference signals from separate terminals provided one for each cylinder, and said internal combustion engine control unit has input terminals provided one for each cylinder for receiving said reference signals, and said arithmetic processing section identifies said cylinders based on from which input terminals said reference signals are input to said internal combustion engine control unit.

5. The control system for an internal combustion engine according to claim 2, wherein said reference signal generator generates said reference signals from separate terminals provided one for each cylinder, and said internal combustion engine control unit has input terminals provided one for each cylinder for receiving said reference signals, and said arithmetic processing section identifies said cylinders based on from which input terminals said reference signals are input to said internal combustion engine control unit.

6. The control system for an internal combustion engine according to claim 3, wherein said reference signal generator generates said reference signals from separate terminals provided one for each cylinder, and said internal combustion engine control unit has input terminals provided one for each cylinder for receiving said reference signals, and said arithmetic processing section identifies said cylinders based on from which input terminals said reference signals are input to said internal combustion engine control unit.

7. The control system for an internal combustion engine according to claim 2, wherein said arithmetic processing section of said internal combustion engine control unit determines the operating conditions from a cycle of said reference signals input thereto.

8. The control system for an internal combustion engine according to claim 3, wherein said arithmetic processing section of said internal combustion engine control unit determines the operating conditions from a cycle of said reference signals input thereto.

9. The control system for an internal combustion engine according to claim 4, wherein said arithmetic processing section of said internal combustion engine control unit determines the operating conditions from a cycle of said reference signals input thereto.

10. The control system for an internal combustion engine according to claim 5, wherein said arithmetic processing section of said internal combustion engine control unit determines the operating conditions from a cycle of said reference signals input thereto.

11. The control system for an internal combustion engine according to claim 6, wherein said arithmetic processing section of said internal combustion engine control unit determines the operating conditions from a cycle of said reference signals input thereto.

* * * * *